United States Patent
Hou et al.

(10) Patent No.: US 7,024,441 B2
(45) Date of Patent: Apr. 4, 2006

(54) PERFORMANCE OPTIMIZED APPROACH FOR EFFICIENT NUMERICAL COMPUTATIONS

(75) Inventors: Yan Hou, Folsom, CA (US); Hong Jiang, San Jose, CA (US); Kam Leung, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 547 days.

(21) Appl. No.: 09/970,612

(22) Filed: Oct. 3, 2001

(65) Prior Publication Data

US 2003/0088599 A1 May 8, 2003

(51) Int. Cl.
*G06F 17/14* (2006.01)
(52) U.S. Cl. .................... 708/402; 708/603
(58) Field of Classification Search ............ 708/402, 708/603, 420, 422, 319, 501, 523
See application file for complete search history.

(56) References Cited

U.S. PATENT DOCUMENTS

| | | | | |
|---|---|---|---|---|
| 5,930,160 | A * | 7/1999 | Mahant-Shetti | 708/603 |
| 6,327,602 | B1 * | 12/2001 | Kim | 708/401 |
| 6,505,221 | B1 * | 1/2003 | Maschmann | 708/306 |
| 6,519,621 | B1 * | 2/2003 | Yano | 708/603 |
| 6,530,010 | B1 * | 3/2003 | Hung et al. | 712/1 |
| 6,643,768 | B1 * | 11/2003 | Ganapathy et al. | 712/221 |
| 6,754,805 | B1 * | 6/2004 | Juan | 712/35 |
| 2001/0031096 | A1 * | 10/2001 | Schwartz et al. | 382/250 |
| 2001/0032226 | A1 * | 10/2001 | Takano et al. | 708/300 |
| 2002/0010728 | A1 * | 1/2002 | Stoye | 708/319 |

* cited by examiner

*Primary Examiner*—D. H. Malzahn
(74) *Attorney, Agent, or Firm*—Sharon Wong (57) ABSTRACT

In particular, the present invention relates to a method and system for improving the efficiency of computational processes and specifically multiply and accumulate ("MAC") processes such as the DCT ("Discrete Cosine Transform") and/or IDCT ("Inverse Discrete Cosine Transform") using a performance optimized method and associated hardware apparatus.

10 Claims, 9 Drawing Sheets

PERFORMANCE OPTIMIZED APPROACH FOR EFFICIENT NUMERICAL COMPUTATIONS

FIELD OF THE INVENTION

The present invention relates to the areas of computation and algorithms and specifically to the areas of digital signal processing ("DSP") and digital logic for performing DSP operations to the areas of digital signal processing, algorithms, structures and systems for performing digital signal processing. In particular, the present invention relates to a method and system for improving the efficiency of computational processes and specifically multiply and accumulate ("MAC") processes such as the DCT ("Discrete Cosine Transform") and/or IDCT ("Inverse Discrete Cosine Transform") using a performance optimized method and associated hardware apparatus.

BACKGROUND INFORMATION

Digital signal processing ("DSP") and information theory technology is essential to modern information processing and in telecommunications for both the efficient storage and transmission of data. In particular, effective multimedia communications including speech, audio and video relies on efficient methods and structures for compression of the multimedia data in order to conserve bandwidth on the transmission channel as well as to conserve storage requirements.

Many DSP algorithms rely on transform kernels such as an FFT ("Fast Fourier Transform"), DCT ("Discrete Cosine Transform"), etc. For example, the discrete cosine transform ("DCT") has become a very widely used component in performing compression of multimedia information, in particular video information. The DCT is a loss-less mathematical transformation that converts a spatial or time representation of a signal into a frequency representation. The DCT offers attractive properties for converting between spatial/time domain and frequency representations of signals as opposed to other transforms such as the DFT ("Discrete Fourier Transform")/FFT. In particular, the kernel of the transform is real, reducing the complexity of processor calculations that must be performed. In addition, a significant advantage of the DCT for compression is that it exhibits an energy compaction property, wherein the signal energy in the transform domain is concentrated in low frequency components, while higher frequency components are typically much smaller in magnitude, and may often be discarded. The DCT is in fact asymptotic to the statistically optimal Karhunen-Loeve transform ("KLT") for Markov signals of all orders. Since its introduction in 1974, the DCT has been used in many applications such as filtering, trans-multiplexers, speech coding, image coding (still frame, video and image storage), pattern recognition, image enhancement and SAR/IR image coding. The DCT has played an important role in commercial applications involving DSP, most notably it has been adopted by MPEG ("Motion Picture Experts Group") for use in MPEG 2 and MPEG 4 video compression algorithms.

A computation that is common in digital filters such as finite impulse response ("FIR") filters or linear transforma tions such as the DFT and DCT may be expressed mathematically by the following dot-product equation:

$$d = \sum_{i=0}^{N-1} a(i) * b(i)$$

where a(i) are the input data, b(i) are the filter coefficients (taps) and d is the output. Typically a multiply-accumulator ("MAC") is employed in traditional DSP design in order to accelerate this type of computation. A MAC kernel can be described by the following equation:

$d^{[i+1]} = d^{[i]} + a(i)*b(i)$ with initial value $d^{[0]}=0$.

DETAILED DESCRIPTION

Figure 1A:
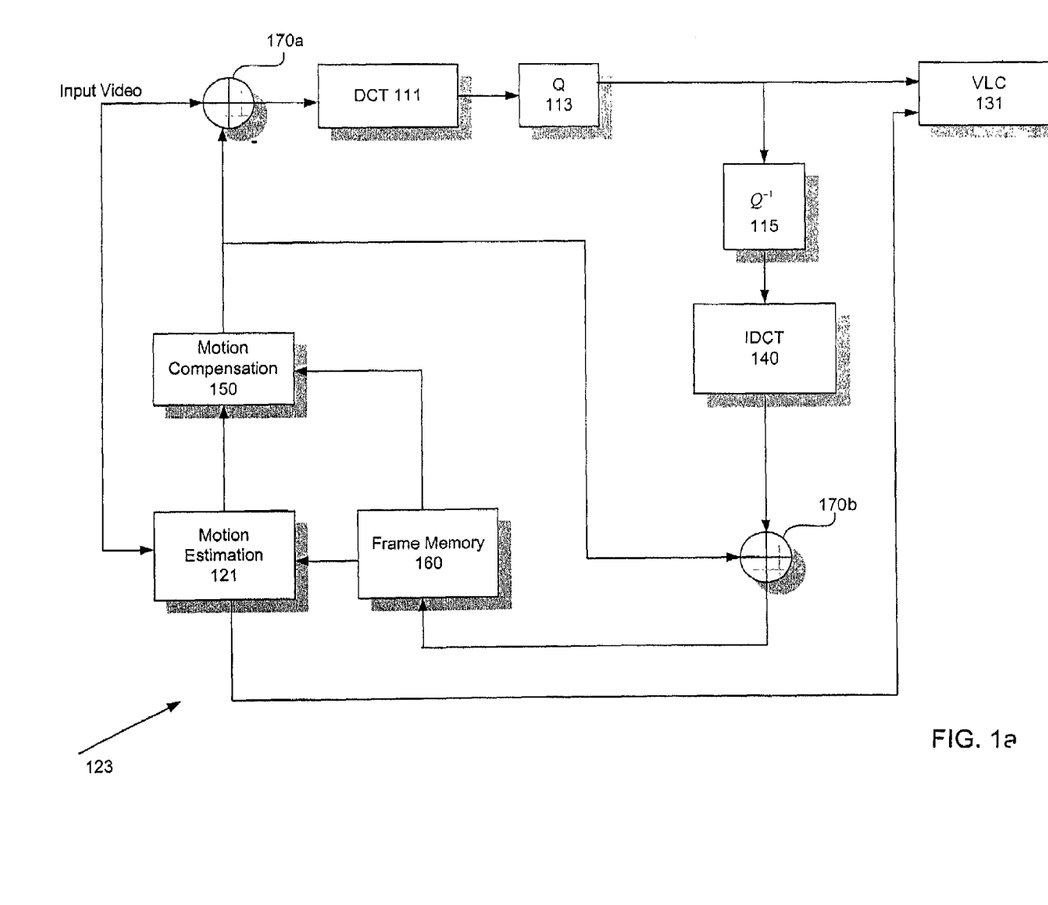
FIG. 1a is a block diagram of a video encoding system.

FIG. 1a is a block diagram of a video encoding system. Video encoding system 123 includes DCT block 111, quantization block 113, inverse quantization block 115, IDCT block 140, motion compensation block 150, frame memory block 160, motion estimation block and VLC ("Variable Length Coder") block 131. Input video is received in digitized form. Together with one or more reference video data from frame memory, input video is provided to motion estimation block 121, where a motion estimation process is performed. The output of motion estimation block 121 containing motion information such as motion vectors is transferred to motion compensation block 150 and VLC block 131. Using motion vectors and one or many reference video data, motion compensation block 150 performs motion compensation process to generate motion prediction results. Input video is subtracted at adder 170a by the motion prediction results from motion compensation block 150.

The output of adder is provided to DCT block 111 where a DCT computed. The output of the DCT is provided to quantization block 113, where the frequency coefficients are quantized and then transmitted to VLC ("Variable Length Coder") 131, where a variable length coding process (e.g., Huffman coding) is performed. Motion information from motion estimation block 121 and quantized indices of DCT coefficients from Q block 113 are provided to VLC block 131. The output of VLC block 131 is the compressed video data output from video encoder 123 The output of quantities block 113 is also transmitted to inverse quantization block 115, where an inverse quantization process is performed.

The output of inverse quantization block is provided to IDCT block 140, where IDCT is performed. The output of IDCT block is summered at adder 107(*b*) with motion prediction results from motion compensation. The output of adder 170*b* is reconstructed video data and is stored in the frame memory block 160 to serve as reference data for the encoding of future video data.

Figure 1B:
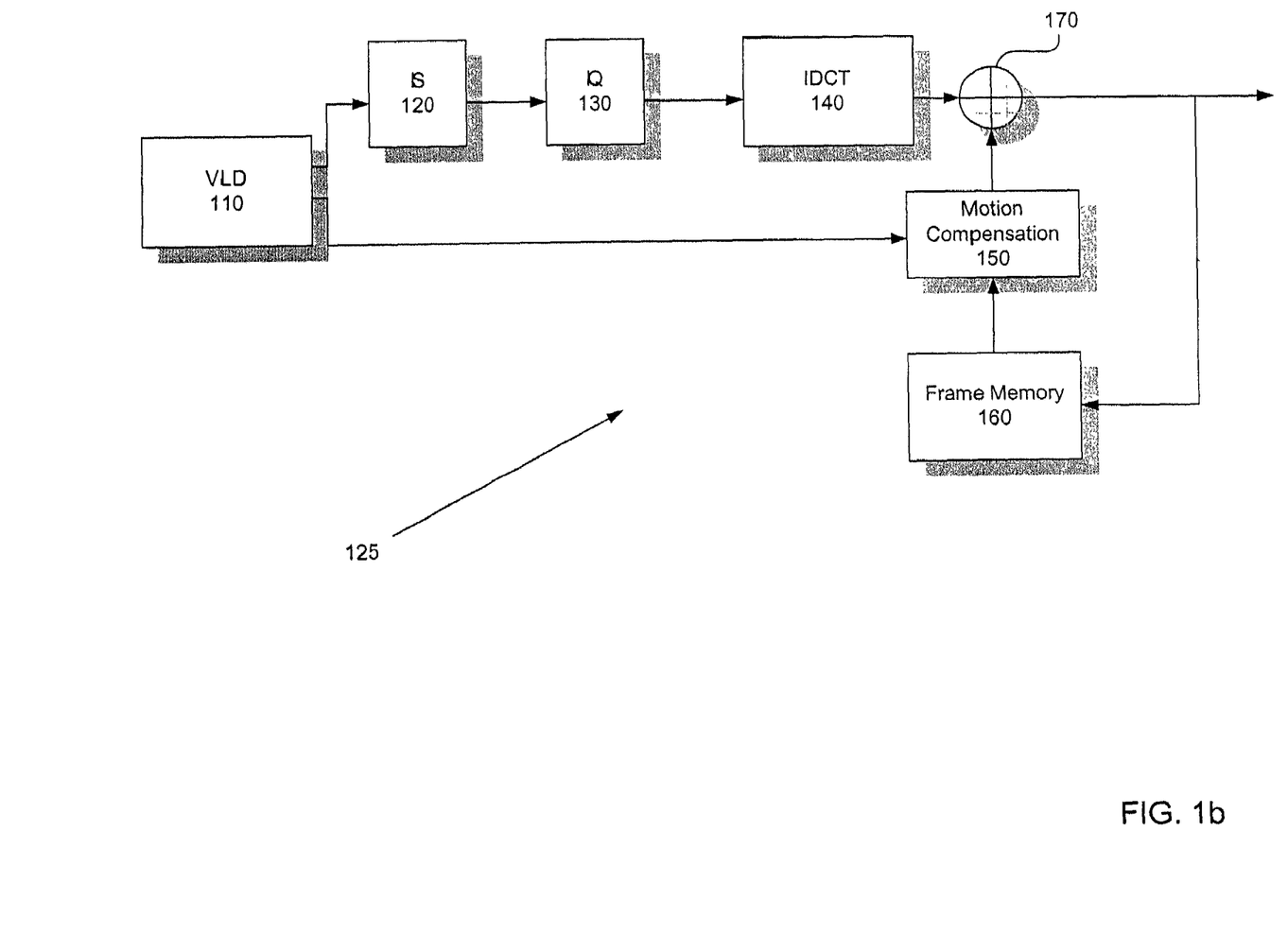
FIG. 1b is a block diagram of a video decoding system.

FIG. 1*b* is a block diagram of a video decoding system. Video decoding system 125 includes variable length decoder ("VLD") block 110, inverse scan ("IS") block 120, inverse quantization block ("IQ") 130, IDCT block 140, frame memory block 160, motion compensation block 150 and adder 170. A compressed video bitstream is received by VLD block and decoded. The decoded symbols are converted into quantized indices of DCT coefficients and their associated sequential locations in a particular scanning order. The sequential locations are then converted into frequency-domain locations by the IS block 120. The quantized indices of DCT coefficients are converted to DCT coefficients by the IQ block 130. The DCT coefficients are received by IDCT block 140 and transformed. The output from the IDCT is then combined with the output of motion compensation block 150 by the adder 170. The motion compensation block 150 may reconstruct individual pictures based upon the changes from one picture to its reference picture(s). Data from the reference picture(s), a previous one or a future one or both, may be stored in a temporary frame memory block 160 such as a frame buffer and may be used as the references. The motion compensation block 150 uses the motion vectors decoded from the VLD 110 to determine how the current picture in the sequence changes from the reference picture(s). The output of the motion compensation block 150 is the motion prediction data. The motion prediction data is added to the output of the IDCT 140 by the adder 170. The output from the adder 170 is then clipped (not shown) to become the reconstructed video data.

Figure 2:
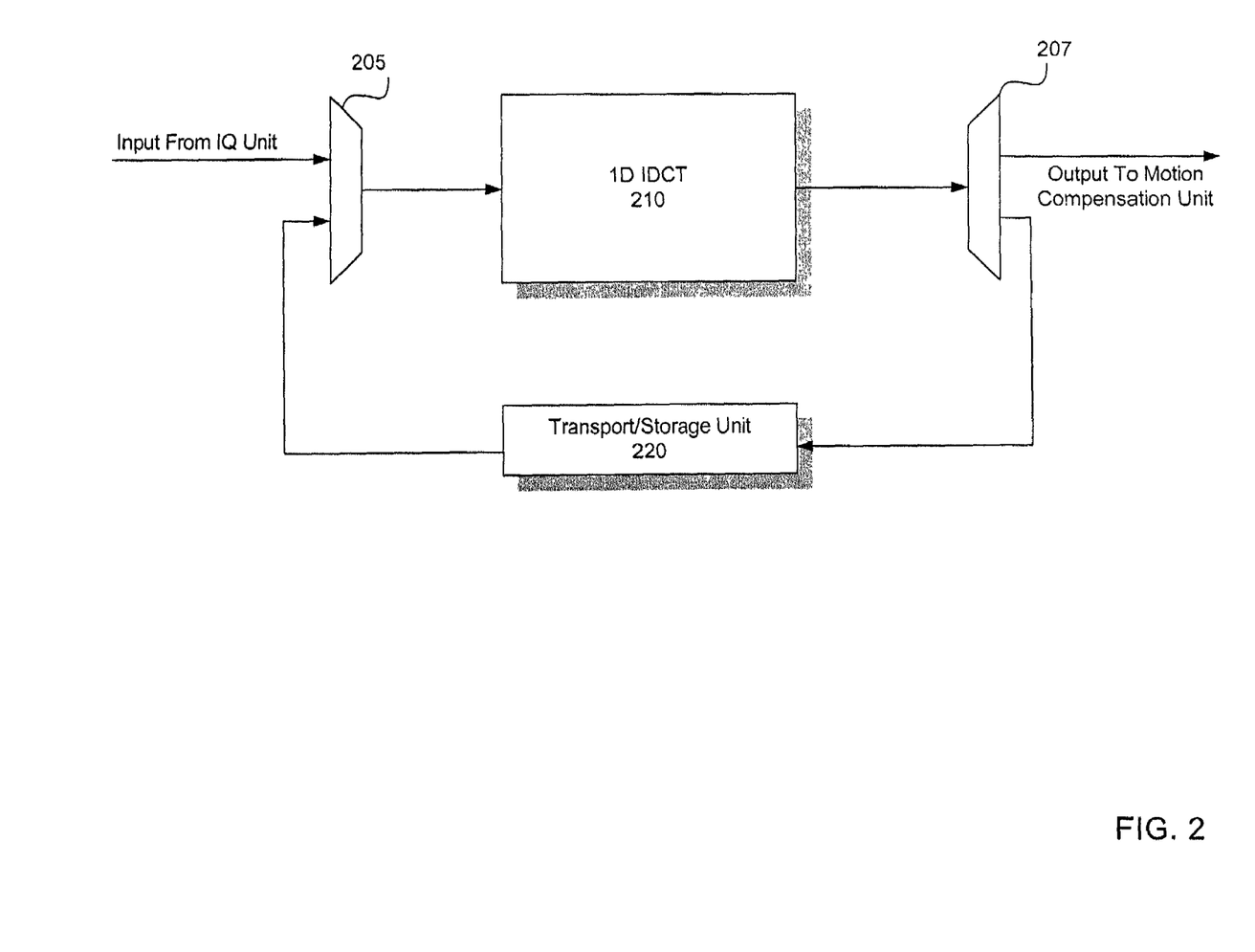
FIG. 2 is a block diagram of a datapath for computing a 2-D IDCT.

FIG. 2 is a block diagram of a datapath for computing a 2-dimensional (2D) IDCT according to one embodiment of the present invention. It includes a data multiplexer 205, a 1D IDCT block 210, a data demultiplexer 207 and a transport storage unit 220. Incoming data from IQ is processed in two passes through the IDCT. In the first pass, the IDCT block is configured to perform a 1D IDCT transform along vertical direction. In this pass, data from IQ is selected by the multiplexer 210, processed by the 1D IDCT block 210. The output from IDCT block 210 is an intermediate results that are selected by the demultiplexer to be stored in the transport storage unit 220. In the second pass, IDCT block 210 is configured to perform 1D IDCT along horizontal direction. As such, the intermediate data stored in the transport storage unit 220 is selected by multiplexer 205, and processed by the 1D IDCT block 210. Demultiplexer 207 outputs results from the 1D IDCT block as the final result of the 2D IDCT.

Many computational processes such as the transforms described above (i.e., DCT, IDCT, DFT, etc) and filtering operations rely upon a multiply and accumulate kernel. That is, the algorithms are effectively performed utilizing one or more multiply and accumulate components typically implemented as specialized hardware on a DSP or other computer chip. The commonality of the MAC nature of these processes has resulted in the development of particular digital logic and circuit structures to carry out multiply and accumulate processes. In particular, a fundamental component of any DSP chip today is the MAC unit.

Figure 3:
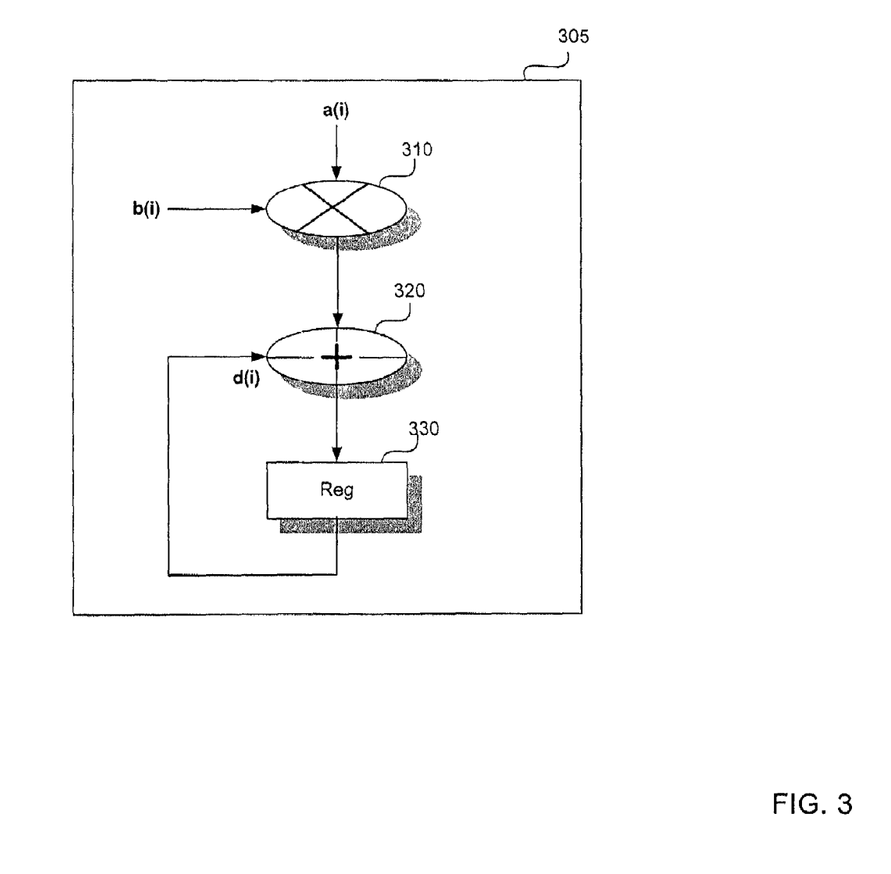
FIG. 3 is a block diagram illustrating the operation of a MAC kernel.

FIG. 3 is a block diagram illustrating the operation of a MAC kernel. Multiplier 310 performs multiplication of input datum a(i) and filter coefficient b(i), the result of which is passed to adder 320. Adder 320 adds the result of multiplier 310 to accumulated output $d^{[i]}$ which was previously stored in register 330. The output of adder 320 ($d^{[i+1]}$) is then stored in register 330. Typically a MAC output is generated on each clock cycle.

The present invention provides a method and system for optimized numerical computations. The present invention is particularly suitable for multiply accumulate processes such as transforms, linear filtering operations, etc. One embodiment described herein relates to the application of the invention to a more efficient IDCT computation. The present invention may also be applied to the DFT, DCT, FFT and/or other multiply and accumulate processes such as those typically utilized in performing transforms. An embodiment described herein relates to the application of the MAAC architecture to calculation of the IDCT. However, the present invention may be applied in any multiply accumulate process such as a DCT, DFT, digital filter, etc. and the embodiments described herein are not intended to limit the scope of the claims appended hereto.

In particular, the present invention provides for efficient computation of a class of expressions of the form $$d = \sum_{i=0}^{N-1} a(i) * b(i).$$

In order to improve the efficiency of this class of computation, the invention utilizes a new computational architecture herein referred to as the MAAC architecture, and an AMAAC architecture, which provides for more efficient execution of this class of computational processes.

According to one embodiment, the present invention provides a method and system for efficient and optimized DCT/IDCT computations by capitalizing upon the novel algorithm realized through two new architectural component kernels specifically adopted for performing DSP operations such as the DCT and IDCT, In particular, the present invention provides a MAAC ("Multiply-Add-Accumulator") and AMAAC ("Add-Multiply-Add-Accumulator") kernel, which specifically capitalize upon the new algorithm described above.

The present invention provides a new accumulator architecture, herein referred to as the MAAC kernel. The MAAC kernel can be described by the following recursive equation:

$$d^{[i+1]} = d^{[i]} + a(i)*b(i) + c(i) \text{ with initial value } d^{[0]} = 0.$$

Figure 4:
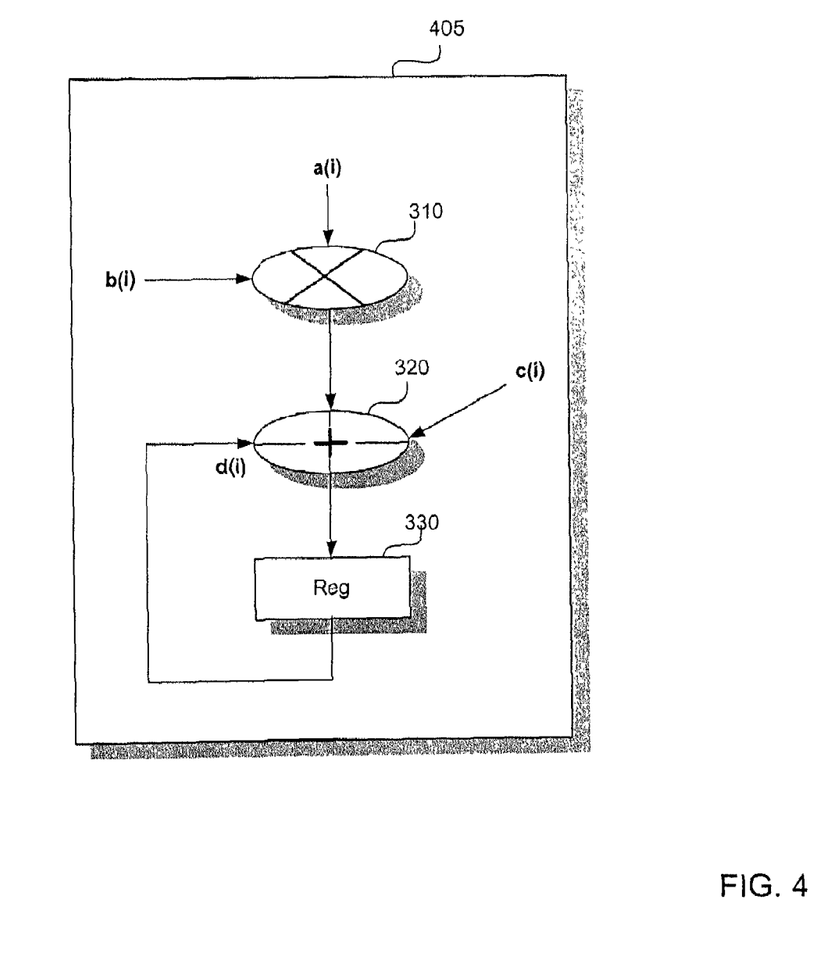
FIG. 4 is a block diagram illustrating the operation of a MAAC kernel according to one embodiment of the present invention.

FIG. 4 is a block diagram illustrating the operation of a MAAC kernel according to one embodiment of the present invention. MAAC kernel 405 includes multiplier 310, adder 320 and register 330. Multiplier 310 performs multiplication of input datum a(i) and filter coefficient b(i), the result of which is passed to adder 320. Adder 320 adds the result of multiplier 310 to a second input term c(i) along with accumulated output $d^{[i]}$, which was previously stored in register 330. The output of adder 320 ($d^{[i+1]}$) is then stored in register 330.

As an additional addition ($c(i)$) is performed each cycle, the MAAC kernel will have higher performance throughput for some class of computations. For example, the throughput of a digital filter with some filter coefficients equal to one can be improved utilizing the MAAC architecture depicted in FIG. 4.

Figure 5:
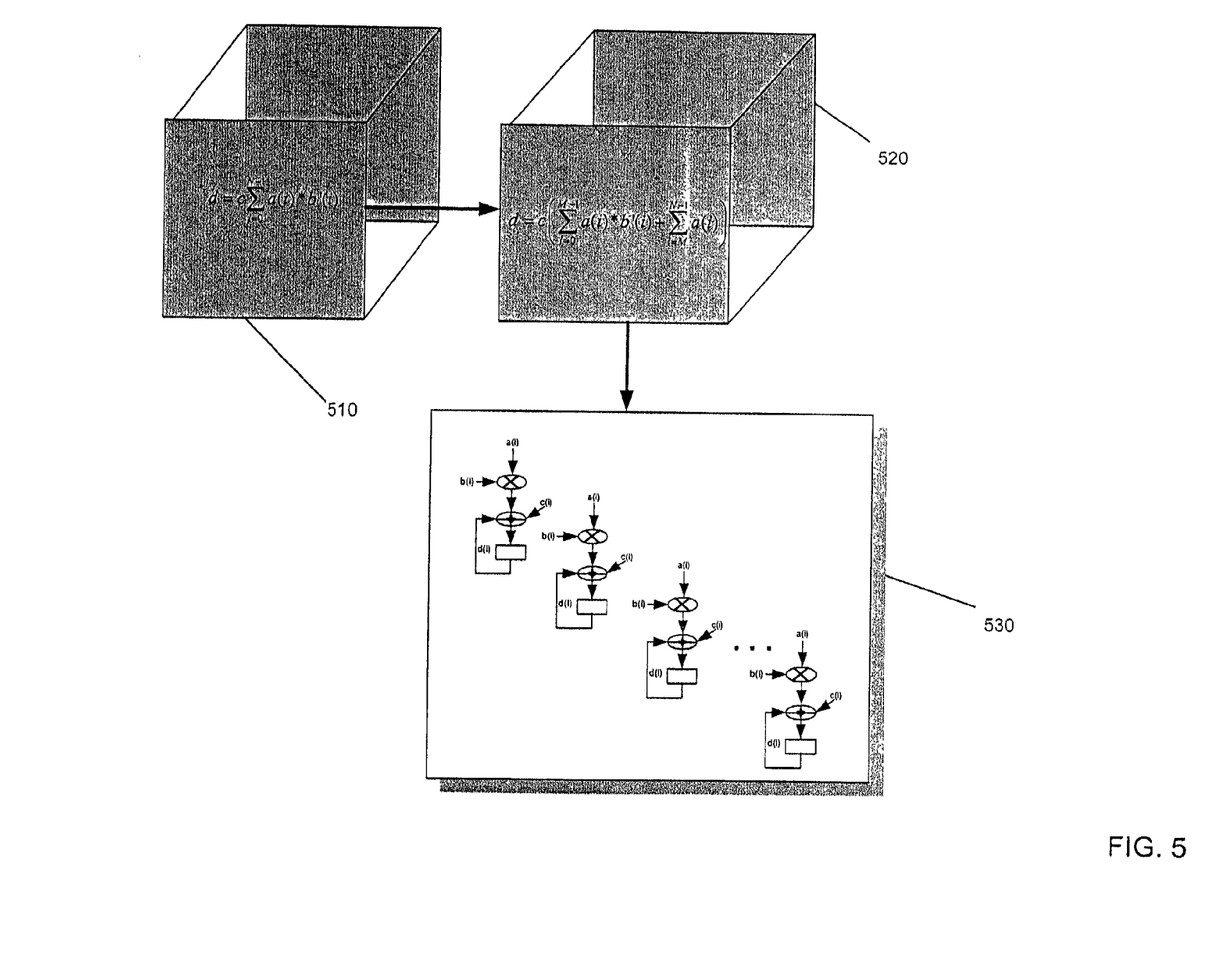
FIG. 5 illustrates a paradigm for improving computational processes utilizing a MAAC kernel according to one embodiment of the present invention.

FIG. 5 illustrates a paradigm for improving computational processes utilizing a MAAC kernel according to one embodiment of the present invention. In 510, an expression for a particular computation is determined. Typically, the computation is expressed as a linear combination of input elements $a(i)$ scaled by a respective coefficient $b(i)$. That is, the present invention provides for improved efficiency of performance for computational problems that may be expressed in the general form:

$$d = \sum_{i=0}^{N-1} a(i) * b(i)$$

where $a(i)$ are the input data, $b(i)$ are coefficients and $d$ is the output. As noted above, utilizing a traditional MAC architecture, output $d$ may be computed utilizing a kernel of the form:

$$d^{[i+1]} = d^{[i]} + a(i)*b(i) \text{ with initial value } d^{[0]}=0.$$

This type of computation occurs very frequently in many applications including digital signal processing, digital filtering etc.

In 520, a common factor 'c' is factored out of the expression obtaining the following expression:

$$d = c \sum_{i=0}^{N-1} a(i) * b'(i) \text{ where } b(i) = cb'(i).$$

If as a result of factoring the common factor c, some of the coefficients $b'(i)$ are unity, then the following result is obtained.

$$d = c \left( \sum_{i=0}^{M-1} a(i) * b'(i) + \sum_{i=M}^{N-1} a(i) \right) \text{ where } \{b'(i) = 1 : M \leq i \leq N-1\}$$

This may be effected, for example, by factoring a matrix expression such that certain matrix entries are '1'. The above expression lends itself to use of the MAAC kernel described above by the recursive equation:

$$d^{[i+1]} = d^{[i]} + a(i)*b(i) + c(i) \text{ with initial value } d^{[0]}=0.$$

In this form the computation utilizes at least one addition per cycle due to the unity coefficients.

In step 530, based upon the re-expression of the computational process accomplished in step 510, one or more MAAC kernels are arranged in a configuration to carry out the computational process as represented in its re-expressed form of step 520.

The paradigm depicted in FIG. 5 is particularly useful for multiply and accumulate computational processes. According to one embodiment, described herein, the method of the present invention is applied to provide a more efficient IDCT computation, which is a multiply and accumulate process typically carried out using a plurality of MAC kernels. However, the present invention may be applied to any type of computational process, not only MAC processes.

According to one embodiment, the present invention is applied to the IDCT in order to reduce computational complexity and improve efficiency. According to the present invention, the number of clock cycles required in a particular hardware implementation to carry out the IDCT is reduced significantly by application of the present invention.

The 2-D DCT may be expressed as follows:

$$y_{kl} = \sqrt{\frac{2}{M}} a(k) \sqrt{\frac{2}{N}} a(l) \sum_{i=0}^{M-1} \sum_{j=0}^{N-1} x_{ij} \cos\left(\frac{(2i+1)k\pi}{2M}\right) \cos\left(\frac{(2j+1)l\pi}{2N}\right)$$

$$\text{where } a(k) = \begin{cases} \frac{1}{\sqrt{2}}, \text{ if } k = 0 \\ 1 \text{ otherwise} \end{cases}$$

The 2-D IDCT may be expressed as follows:

$$x_{ij} = \sum_{k=0}^{M-1} \sum_{l=0}^{N-1} y_{kl} \sqrt{\frac{2}{M}} a(k) \sqrt{\frac{2}{N}} a(l) \cos\left(\frac{(2i+1)k\pi}{2M}\right) \cos\left(\frac{(2j+1)l\pi}{2N}\right)$$

$$\text{where } a(k) = \begin{cases} \frac{1}{\sqrt{2}}, \text{ if } k = 0 \\ 1 \text{ otherwise} \end{cases}$$

The 2-D DCT and IDCT are separable and may be factored as follows:

$$x_{ij} = \sum_{k=0}^{M-1} z_{kj} e_{i,M}(k) \text{ for } i = 0, 1, \ldots, M\text{-}1 \text{ and } j = 0, 1, \ldots, N\text{-}1$$

where the temporal 1-D IDCT data are:

$$z_{kj} = \sum_{l=0}^{N-1} y_{kl} e_{j,N}(l) \text{ for } k = 0, 1, \ldots, M\text{-}1 \text{ and } j = 0, 1, \ldots, N\text{-}1$$

and the DCT basis vectors $e_i(m)$ are:

$$e_{i,M}(k) = \sqrt{\frac{2}{M}} a(k) \cos\left(\frac{(2i+1)l\pi}{2M}\right) \text{ for } i, k = 0, 1, \ldots, M\text{-}1$$

A fast algorithm for calculating the IDCT (Chen) capitalizes of the cyclic property of the transform basis function (the cosine function). For example, for an eight point IDCT, the basis function only assumes 8 different positive and negative values as shown in the following table:

| j/1 | 0 | 1 | 2 | 3 | 4 | 5 | 6 | 7 |
|---|---|---|---|---|---|---|---|---|
| 0 | c(0) | c(1) | c(2) | c(3) | c(4) | c(5) | c(6) | c(7) |
| 1 | c(0) | c(3) | c(6) | -c(7) | -c(4) | -c(1) | -c(2) | -c(5) |
| 2 | c(0) | c(5) | -c(6) | -c(1) | -c(4) | c(7) | c(2) | c(3) |

-continued

| j/l | 0 | 1 | 2 | 3 | 4 | 5 | 6 | 7 |
|-----|---|---|---|---|---|---|---|---|
| 3 | c(0) | c(7) | -c(2) | -c(5) | c(4) | c(3) | -c(6) | -c(1) |
| 4 | c(0) | -c(7) | -c(2) | c(5) | c(4) | -c(3) | -c(6) | c(1) |
| 5 | c(0) | -c(5) | -c(6) | c(1) | -c(4) | -c(7) | c(2) | -c(3) |
| 6 | c(0) | -c(3) | c(6) | c(7) | -c(4) | c(1) | -c(2) | c(5) |
| 7 | c(0) | -c(1) | c(2) | -c(3) | c(4) | -c(5) | c(6) | -c(7) |

Where c(m) is the index of the following basis terms.

$$c(m) = a(m)\cos\left(\frac{m\pi}{16}\right)$$

$$= \left\{\cos\left(\frac{\pi}{4}\right), \cos\left(\frac{\pi}{16}\right), \cos\left(\frac{\pi}{8}\right), \cos\left(\frac{3\pi}{16}\right), \cos\left(\frac{\pi}{4}\right),\right.$$

$$\left.\cos\left(\frac{5\pi}{16}\right), \cos\left(\frac{3\pi}{8}\right), \cos\left(\frac{7\pi}{16}\right)\right\}$$

$$= \left\{\cos\left(\frac{\pi}{4}\right), \cos\left(\frac{\pi}{16}\right), \cos\left(\frac{\pi}{8}\right), \cos\left(\frac{3\pi}{16}\right), \cos\left(\frac{\pi}{4}\right),\right.$$

$$\left.\sin\left(\frac{3\pi}{16}\right), \sin\left(\frac{\pi}{8}\right), \sin\left(\frac{\pi}{16}\right)\right\}$$

The cyclical nature of the IDCT shown in the above table provides the following relationship between output terms of the 1-D IDCT:

$$\frac{x_i + x_{7-i}}{2} = e_i(0)y_0 + e_i(2)y_2 + e_i(4)y_4 + e_i(6)y_6$$

$$\frac{x_i - x_{7-i}}{2} = e_i(1)y_1 + e_i(3)y_3 + e_i(5)y_5 + e_i(7)y_7$$

where the basis terms $e_i(k)$ have sign and value mapped to the DCT basis terms c(m) according to the relationship:

$$e_i(k) = \pm\frac{1}{2}c(m(i,k))$$

For a 4-point IDCT, the basis terms also have the symmetrical property illustrated in the above table as follows:

| j/l | 0 | 1 | 2 | 3 |
|-----|---|---|---|---|
| 0 | C(0) | C(2) | C(4) | C(6) |
| 1 | C(0) | C(6) | -C(4) | -C(2) |
| 2 | C(0) | -C(6) | -C(4) | C(2) |
| 3 | C(0) | -C(2) | C(4) | -C(6) |

The corresponding equations are:

$$\frac{x_i + x_{3-i}}{2} = e_i(0)y_0 + e_i(4)y_2$$

$$\frac{x_i - x_{3-i}}{2} = e_i(2)y_1 + e_i(6)y_3$$

Based upon the above derivation, a 1D 8-point IDCT can be represented by the following matrix vector equation:

$$\begin{bmatrix} x_0 \\ x_1 \\ x_2 \\ x_3 \end{bmatrix} = \frac{1}{2}A\begin{bmatrix} y_0 \\ y_4 \\ y_2 \\ y_6 \end{bmatrix} + \frac{1}{2}B\begin{bmatrix} y_1 \\ y_5 \\ y_3 \\ y_7 \end{bmatrix} \quad \begin{bmatrix} x_7 \\ x_6 \\ x_5 \\ x_4 \end{bmatrix} = \frac{1}{2}A\begin{bmatrix} y_0 \\ y_4 \\ y_2 \\ y_6 \end{bmatrix} - \frac{1}{2}B\begin{bmatrix} y_1 \\ y_5 \\ y_3 \\ y_7 \end{bmatrix}$$

where:

$$A = \begin{bmatrix} c(0) & c(4) & c(2) & c(6) \\ c(0) & -c(4) & c(6) & -c(2) \\ c(0) & -c(4) & -c(6) & c(2) \\ c(0) & c(4) & -c(2) & -c(6) \end{bmatrix}$$

$$B = \begin{bmatrix} c(1) & c(5) & c(3) & c(7) \\ c(3) & -c(1) & -c(7) & -c(5) \\ c(5) & c(7) & -c(1) & c(3) \\ c(7) & c(3) & -c(5) & -c(1) \end{bmatrix}$$

and $c(0) = \cos\left(\frac{\pi}{4}\right)$ and $c(n) = \cos\left(\frac{n\pi}{16}\right)$ (n = 1, 2, 3, 4, 5, 6 7)

Note that $A^{-1} = \frac{1}{2}A^T$ and $B^{-1} = \frac{1}{2}B^T$

Using the paradigm depicted in FIG. 5, a common factor may be factored from the matrix equation above such that certain coefficients are unity. The unity coefficients then allow for the introduction of a number of MAAC kernels in a computational architecture, thereby reducing the number of clock cycles required to carry out the IDCT. In particular, by factoring $$c(0) = c(4) = \frac{1}{\sqrt{2}}$$

out from the matrix vector equation above, the following equation is obtained.

$$\begin{bmatrix} x_0 \\ x_1 \\ x_2 \\ x_3 \end{bmatrix} = \frac{1}{2}A'\begin{bmatrix} y_0 \\ y_4 \\ y_2 \\ y_6 \end{bmatrix} + \frac{1}{2}B'\begin{bmatrix} y_1 \\ y_5 \\ y_3 \\ y_7 \end{bmatrix} \quad \begin{bmatrix} x_7 \\ x_6 \\ x_5 \\ x_4 \end{bmatrix} = \frac{1}{2}A'\begin{bmatrix} y_0 \\ y_4 \\ y_2 \\ y_6 \end{bmatrix} - \frac{1}{2}B'\begin{bmatrix} y_1 \\ y_5 \\ y_3 \\ y_7 \end{bmatrix}$$

where:

$$A = \begin{bmatrix} 1 & 1 & c'(2) & c'(6) \\ 1 & -1 & c'(6) & -c'(2) \\ 1 & -1 & -c'(6) & c'(2) \\ 1 & 1 & -c'(2) & -c'(6) \end{bmatrix}$$

$$B' = \begin{bmatrix} c'(1) & c'(5) & c'(3) & c'(7) \\ c'(3) & -c'(1) & -c'(7) & -c'(5) \\ c'(5) & c'(7) & -c'(1) & c'(3) \\ c'(7) & c'(3) & -c'(5) & -c'(1) \end{bmatrix}$$

Because the factor $$\frac{1}{\sqrt{2}}$$

is factored out of the matrix vector equation, the results after two-dimensional operations would carry a scale factor of two. Dividing the final result by 2 after the two-dimensional computation would result in the correct transform.

Note that the expression for the IDCT derived above incorporates multiple instances of the generalized expression $$d = \sum_{i=0}^{N-1} a(i) * b(i)$$

re-expressed as $$d = c\left(\sum_{i=0}^{M-1} a(i) * b'(i) + \sum_{i=M}^{N-1} a(i)\right)$$

where {b'(i)=1:M≤i≤N−1} to which the present invention is addressed. This is a consequence of the nature of matrix multiplication and may be seen as follows (unpacking the matrix multiplication):

$x_0=y_0+y_4+c'(2)*y_2+c'(6)*y_6+c'(1)*y_1+c'(5)*y_5+c'(3)*y_3+c'(7)*y_7$ $x_1=y_0-y_4+c'(6)*y_2-c'(2)*y_6+c'(3)*y_1-c'(1)*y_5-c'(7)*y_3-c'(5)*y_7$ $x_2=y_0-y_4-c'(6)*y_2+c'(2)*y_6+c'(5)*y_1-c'(7)*y_5-c'(1)*y_3+c'(3)*y_7$ $x_3=y_0+y_4+c'(2)*y_2-c'(6)*y_6+c'(7)*y_1+c'(3)*y_5-c'(5)*y_3-c'(1)*y_7$ $x_7=y_0+y_4+c'(2)*y_2+c'(6)*y_6-c'(1)*y_1-c'(5)*y_5-c'(3)*y_3-c'(7)*y_7$ $x_6=y_0-y_4+c'(6)*y_2-c'(2)*y_6-c'(3)*y_1+c'(1)*y_5+c'(7)*y_3+c'(5)*y_7$ $x_5=y_0-y_4-c'(6)*y_2+c'(2)*y_6-c'(5)*y_1+c'(7)*y_5+c'(1)*y_3-c'(3)*y_7$ $x_4=y_0+y_4-c'(2)*y_2-c'(6)*y_6-c'(7)*y_1-c'(3)*y_5+c'(5)*y_3+c'(1)*y_7$

Note that the above expressions do not incorporate scale factors ½, which can be computed at the end of the calculation simply as a right bit-shift.

Figure 6:
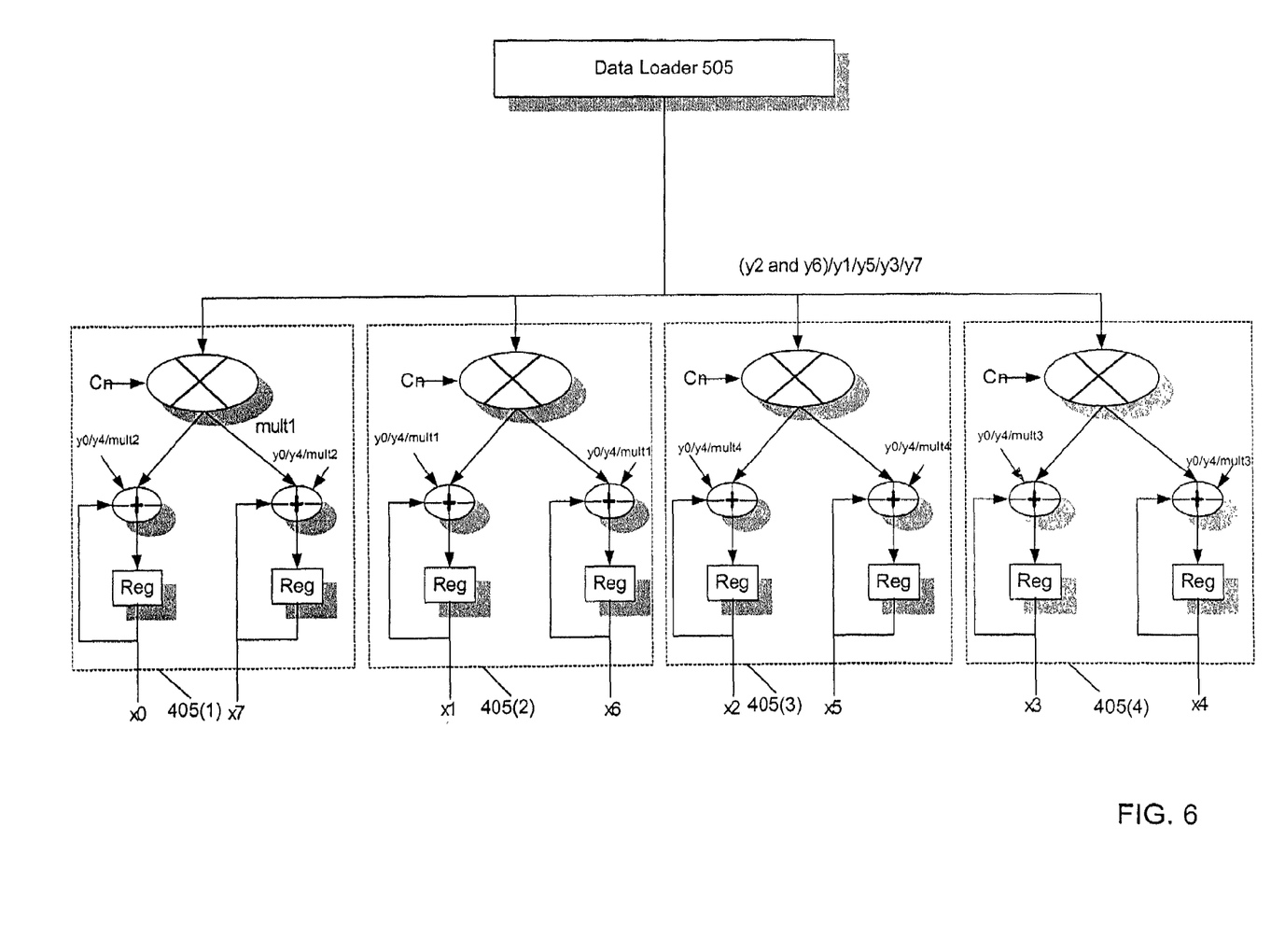
FIG. 6 is a block diagram of a hardware architecture for computing an eight point IDCT utilizing a MAAC kernel according to one embodiment of the present invention.

FIG. 6 is a block diagram of a hardware architecture for computing an eight point IDCT utilizing a MAAC kernel according to one embodiment of the present invention. The hardware architecture of FIG. 6 may be incorporated into a larger datapath for computation of an IDCT. As shown in FIG. 6, data loader 505 is coupled to four dual MAAC kernels 405(1)–405(4), each dual MAAC kernel including two MAAC kernels sharing a common multiplier. Note that the architecture depicted in FIG. 6 is merely illustrative and is not intended to limit the scope of the claims appended hereto. The operation of the hardware architecture depicted in FIG. 5 for computing the IDCT will become evident with respect to the following discussion.

Figure 7:
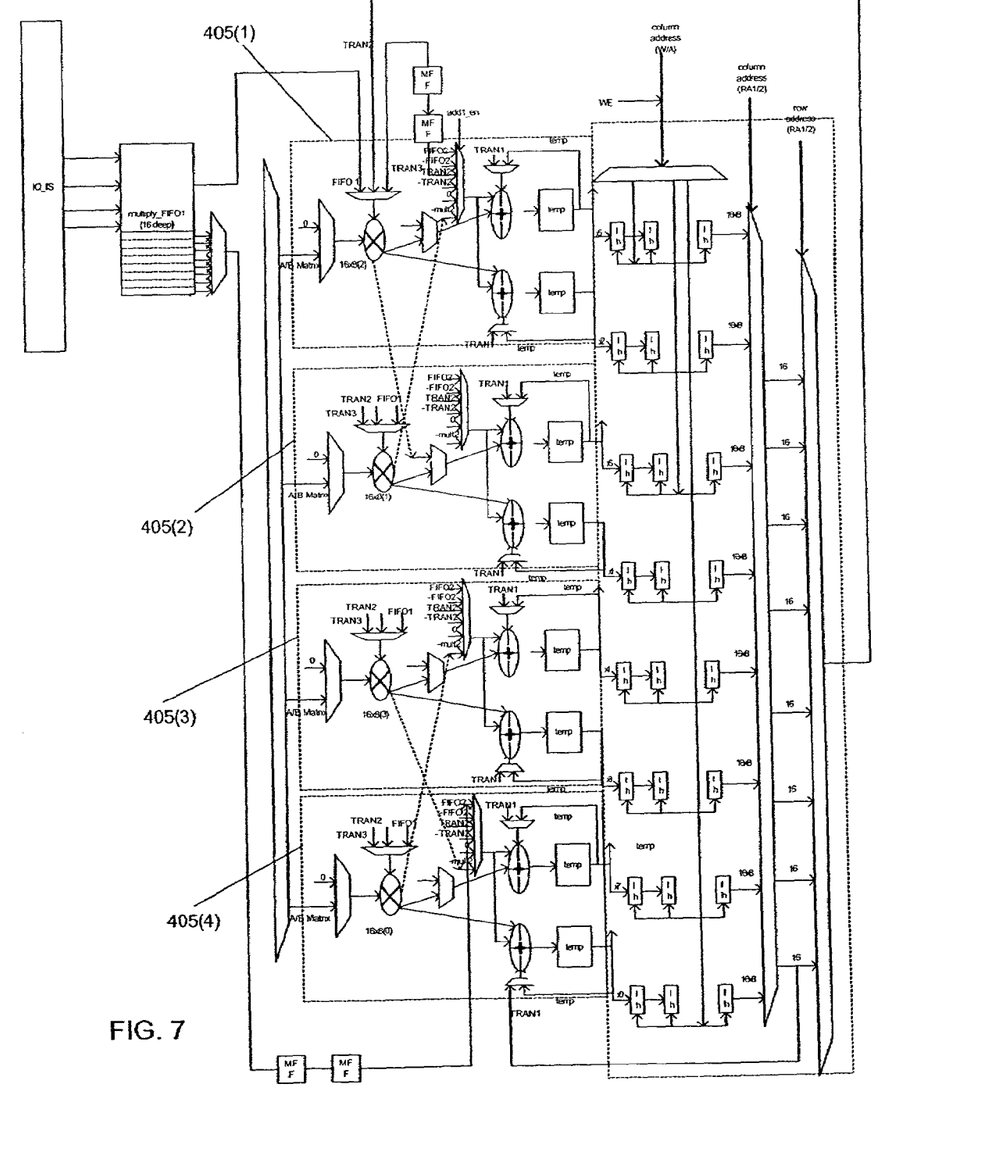
FIG. 7 is a block diagram of a datapath for computation of an 8-point IDCT utilizing the method of the present invention and a number of MAAC kernel components according to one embodiment of the present invention.

Utilizing the architecture depicted in FIG. 6, a 1-D 8-point IDCT can be computed in 5 clock cycles as follows:

$1^{st}$ clock:

mult1=$c'(1)*y_1$ mult2=$c'(3)*y_1$ mult3=$c'(5)*y_1$ mult4=$c'(7)*y_1$ $x_0(clk1)=y_0+mult1+0$ $x_7(clk1)=y_0-mult1+0$ $x_1(clk1)=y_0+mult2+0$ $x_6(clk1)=y_0-mult2+0$ $x_2(clk1)=y_0+mult3+0$ $x_5(clk1)=y_0-mult3+0$ $x_3(clk1)=y_0+mult4+0$ $x_4(clk1)=y_0-mult4+0$ 2nd Clock mult1=$c'(5)*y_5$ mult2=$-c'(1)*y_5$ mult3=$-c'(7)*y_5$ mult4=$c'(3)*y_5$ $x_0(clk2)=y_4+mult1+x_0(clk1)$ $x_7(clk2)=y_4-mult1+x_7(clk1)$ $x_1(clk2)=-y_4+mult2+x_1(clk1)$ $x_6(clk2)=-y_4-mult2+x_6(clk1)$ $x_2(clk2)=-y_4+mult3+x_2(clk1)$ $x_5(clk2)=-y_4-mult3+x_5(clk1)$ $x_3(clk2)=y_4+mult4+x_3(clk1)$ $x_4(clk2)=y_4-mult4+x_4(clk1)$ 3rd Clock mult1=$c'(3)*y_3$ mult2=$-c'(7)*y_3$ mult3=$-c'(1)*y_3$ mult4=$-c'(5)*y_3$ $x_0(clk3)=0+mult1+x_0(clk2)$ $x_7(clk3)=0-mult1+x_7(clk2)$ $x_1(clk3)=0+mult2+x_1(clk2)$ $x_6(clk3)=0-mult2+x_6(clk2)$ $x_2(clk3)=0+mult3+x_2(clk2)$ $x_5(\text{clk3})=0-\text{mult3}+x_6(\text{clk2})$ $x_3(\text{clk3})=0+\text{mult4}+x_3(\text{clk2})$ $x_4(\text{clk3})=0-\text{mult4}+x_4(\text{clk2})$ 4th Clock $\text{mult1}=c'(7)*y_7$ $\text{mult2}=-c'(5)*y_7$ $\text{mult3}=c'(3)*y_7$ $\text{mult4}=-c'(1)*y_7$ $x_0(\text{clk4})=0+\text{mult1}+x_0(\text{clk3})$ $x_7(\text{clk4})=0-\text{mult1}+x_7(\text{clk3})$ $x_1(\text{clk4})=0+\text{mult2}+x_1(\text{clk3})$ $x_6(\text{clk4})=0-\text{mult2}+x_6(\text{clk3})$ $x_2(\text{clk4})=0+\text{mult3}+x_2(\text{clk3})$ $x_5(\text{clk4})=0-\text{mult3}+x_5(\text{clk3})$ $x_3(\text{clk4})=0+\text{mult4}+x_3(\text{clk3})$ $x_4(\text{clk4})=0-\text{mult4}+x_4(\text{clk3})$ 5th Clock $\text{mult1}=c'(2)*y_2$ $\text{mult2}=c'(6)*y_6$ $\text{mult3}=c'(6)*y_2$ $\text{mult4}=-c'(2)*y_6$ $x_0(\text{clk5})=\text{mult2}+\text{mult1}+x_0(\text{clk4})$ $x_7(\text{clk5})=\text{mult2}+\text{mult1}+x_7(\text{clk4})$ $x_1(\text{clk5})=\text{mult3}+\text{mult4}+x_1(\text{clk4})$ $x_6(\text{clk5})=\text{mult3}+\text{mult4}+x_6(\text{clk4})$ $x_2(\text{clk5})=-\text{mult3}-\text{mult4}+x_2(\text{clk4})$ $x_5(\text{clk5})=-\text{mult3}-\text{mult4}+x_5(\text{clk4})$ $x_3(\text{clk5})=-\text{mult1}-\text{mult2}+x_3(\text{clk4})$ $x_4(\text{clk5})=-\text{mult1}-\text{mult2}+x_4(\text{clk4})$ FIG. 7 is a block diagram of a datapath for computation of an 8-point IDCT utilizing the method of the present invention and a number of MAAC kernel components according to one embodiment of the present invention. Note that the datapath shown in FIG. 7 includes four dual MAAC kernels 405(1)–405(4).

According to an alternative embodiment, the MAAC kernel is modified to include two additional additions, to produce a structure herein referred to as the AMAAC kernel. The AMAAC kernel can be described by the following recursive equation:

$d^{[i+1]}=d^{[i]}+[a(i)+e(i)]*b(i)+c(i)$ with initial value $d^{[0]}=0$.

Figure 8:
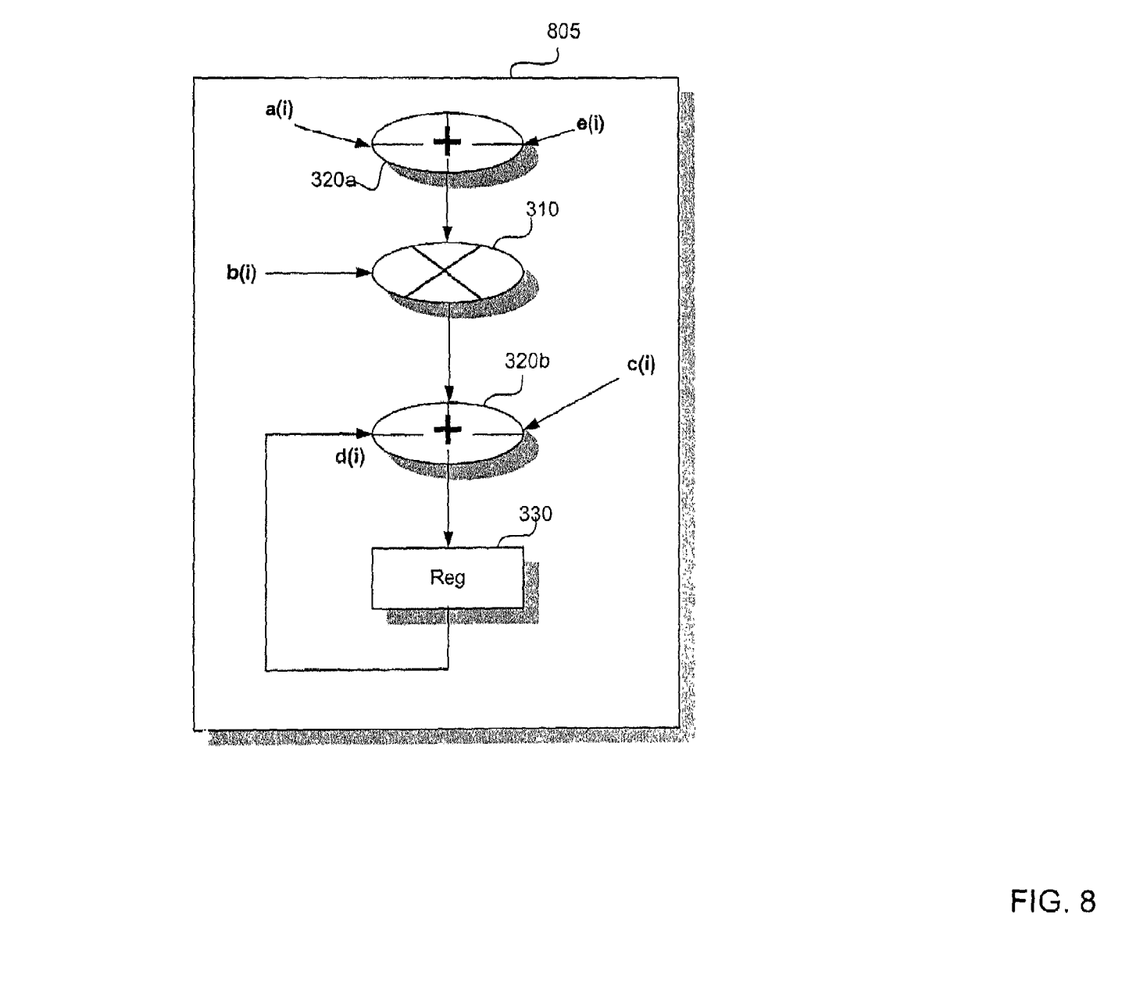
FIG. 8 is a block diagram illustrating the operation of an AMAAC kernel according to one embodiment of the present invention.

FIG. 8 is a block diagram illustrating the operation of an AMAAC kernel according to one embodiment of the present invention. AMAAC kernel 805 includes multiplier 310, first adder 320a, second adder 320b and register 330. First adder 320a adds a(i) and e(i) Multiplier 310 performs multiplication of input datum [a(i)+e(i)] and filter coefficient b(i), the result of which is passed to adder 320b. Adder 320b adds the result of multiplier 310 to a second input term c(i) along with accumulated output $d^{[i]}$, which was previously stored in register 330. The output of adder 320 ($d^{[i+1]}$) is then stored in register 330.

As two more additions are performed during the same AMAAC cycle, the AMAAC kernel has a higher performance throughput for some class of computations.

For example, a digital filter with some filter coefficients with equal value can take advantage (speed up) of the AMAAC kernel. Specifically, a(i), c(i), and e(i) can be considered as input data and b(i) as filter coefficients. With inputs a(i) and e(i) having the same filter coefficients b(i) and inputs c(i) with unity coefficients, all three groups of inputs can be processed in parallel.

According to one embodiment, MAAC and AMAAC computational kernels may be combined to generate a reconfigurable computation engine (for example, to compute the IDCT). By allowing this reconfiguration, hardware logic gates can be shared to improve performance with incurring additional cost. The AMMAC kernel provides a structure for achieving more efficient downsampling computations.

What is claimed is:

1. A method for performing a computation generally expressible in the form $$d = \sum_{i=0}^{N-1} a(i)*b(i)$$

comprising:
    (a) determining a common factor 'c' such that $$d = c\left(\sum_{i=0}^{N-1} a(i)*b'(i)\right)$$

wherein at least one of the b'(i)'s is unity;
    (b) utilizing at least one MAAC kernel to carry out the computation, wherein the at least one MAAC kernel is utilized as a function of a coefficient b'(i) being unity.

2. The method according to claim 1, wherein the MAAC kernel includes a multiplier block, an adder block and a register block, wherein an output of the multiplier block is coupled to an input of the adder block, an output of the adder block is coupled to an input of the register block and an output of the register block is coupled to a second input of the adder block and the adder block receives at its second input an additional addend.

3. The method according to claim 2, wherein the terms a(i) are input data terms and the terms b(i) and b'(i) are coefficients.

4. The method according to claim 3, wherein if a coefficient b'(i) is unity, utilizing a MAAC kernel such that the additional addend is an input term that would be multiplied by the unity coefficient b'(i).

5. The method according to claim 4, wherein the numerical computation is an IDCT computation.

6. The method according to claim 5, wherein an eight-point IDCT is computed utilizing the following expression:

$$\begin{bmatrix} x_0 \\ x_1 \\ x_2 \\ x_3 \end{bmatrix} = \frac{1}{2}A' \begin{bmatrix} y_0 \\ y_4 \\ y_2 \\ y_6 \end{bmatrix} + \frac{1}{2}B' \begin{bmatrix} y_1 \\ y_5 \\ y_3 \\ y_7 \end{bmatrix} \begin{bmatrix} x_7 \\ x_6 \\ x_5 \\ x_4 \end{bmatrix} = \frac{1}{2}A' \begin{bmatrix} y_0 \\ y_4 \\ y_2 \\ y_6 \end{bmatrix} - \frac{1}{2}B' \begin{bmatrix} y_1 \\ y_5 \\ y_3 \\ y_7 \end{bmatrix}$$

where:

$$A' = \begin{bmatrix} 1 & 1 & c'(2) & c'(6) \\ 1 & -1 & c'(6) & -c'(2) \\ 1 & -1 & -c'(6) & c'(2) \\ 1 & 1 & -c'(2) & -c'(6) \end{bmatrix} B = \begin{bmatrix} c'(1) & c'(5) & c'(3) & c'(7) \\ c'(3) & -c'(1) & -c'(7) & -c'(5) \\ c'(5) & c'(7) & -c'(1) & c'(3) \\ c'(7) & c'(3) & -c'(5) & -c'(1) \end{bmatrix}.$$

7. A computational kernel for carrying out numerical computations including:
   a multiplier block;
   an adder block;
   a register block;
wherein an output of the multiplier block is coupled to a first input of the adder block, an output of the adder block is coupled to an input of the register block and an output of the register block is coupled to a second input of the adder block, the adder block receiving a third input, wherein the additional input provided to the adder block is an input datum associated with a unity coefficient and the multiplier block receives an input coefficient.

8. A computational architecture kernel for carrying out numerical computations including:
   a multiplier block;
   a first adder block;
   a second adder block;
   a register block;
wherein the first adder block receives two inputs (e(i) and a(i)) and an output of the first adder block is coupled to a first input of the multiplier block, the multiplier block receiving a second input (b(i)) and an output of the multiplier block coupled to a first input of the second adder block, the second adder block receiving a second input (c(i)) and an output of the second adder block is coupled to an input of the register block, an output of the register block coupled to a third input of the second adder block, and the two inputs to the first adder block (a(i) and e(i)) and the additional input to the second adder block (c(i)) are input data each respectively associated with a unity coefficient and the additional input to the multiplier block being a coefficient.

9. A system for performing a computation generally expressible in the form $$d = \sum_{i=0}^{N-1} a(i) * b(i)$$

comprising:
   (a) a plurality of MAAC kernels, wherein each MAAC kernel includes:
      a multiplier block;
      an adder block;
      a register block;
   wherein an output of the multiplier block is coupled to a first input of the adder block, an output of the adder block is coupled to an input of the register block and an output of the register block is coupled to a second input of the adder block, the adder block receiving a third input, wherein the general expression $$d = \sum_{i=0}^{N-1} a(i) * b(i)$$

may be expressed as $$d = c \left( \sum_{i=0}^{M-1} a(i) * b'(i) \right)$$

where 'c' is a common factor and at least one of the b'(i)'s is unity.

10. The system according to claim 9, wherein the additional input at each adder block for each of the plurality of MAAC kernels is an input term associated with a coefficient b'(i) being unity.

* * * * *

UNITED STATES PATENT AND TRADEMARK OFFICE
CERTIFICATE OF CORRECTION

| | |
|---|---|
| PATENT NO. | : 7,024,441 B2 |
| APPLICATION NO. | : 09/970612 |
| DATED | : April 4, 2006 |
| INVENTOR(S) | : Hou et al. |

Page 1 of 1

It is certified that error appears in the above-identified patent and that said Letters Patent is hereby corrected as shown below:

In column 1, at line 25, delete "modem" and insert --modern--.

In column 2, at line 67, delete "Huffinan" and insert --Huffman--.

Signed and Sealed this

Sixth Day of November, 2007

JON W. DUDAS
*Director of the United States Patent and Trademark Office*